(12) United States Patent
Dickson

(10) Patent No.: US 6,556,285 B1
(45) Date of Patent: Apr. 29, 2003

(54) METHOD AND APPARATUS FOR OPTICAL BEAM ALIGNMENT DETECTION AND CONTROL

(75) Inventor: William C. Dickson, San Mateo, CA (US)

(73) Assignee: Glimmerglass Networks, Inc., Hayward, CA (US)

( * ) Notice: Subject to any disclaimer, the term of this patent is extended or adjusted under 35 U.S.C. 154(b) by 0 days.

(21) Appl. No.: 09/935,467

(22) Filed: Aug. 20, 2001

(51) Int. Cl.⁷ .................................................. G01J 1/00
(52) U.S. Cl. ...................................................... 356/121
(58) Field of Search .............................. 356/121, 73.1, 356/399, 400, 401; 250/227.24, 201.1

(56) References Cited

U.S. PATENT DOCUMENTS

| | | | | |
|---|---|---|---|---|
| 4,452,506 A | * | 6/1984 | Reeve et al. ............ | 250/227.24 |
| 5,177,348 A | * | 1/1993 | Laor ....................... | 250/201.1 |
| 6,097,858 A | | 8/2000 | Laor | |

OTHER PUBLICATIONS

Located on Website on Jul. 6, 2001, Melles Griot NanoTrak Auto Alignment Systems, http://www/wellesgriot.com/pdg/00.34.2–34.4.pdg.

* cited by examiner

Primary Examiner—Michael P. Stafira
(74) Attorney, Agent, or Firm—Townsend and Townsend and Crew LLP; Kenneth R. Allen

(57) ABSTRACT

Methods and apparatus are provided for detection and control of multiple-axis active alignment for a free-space-coupled single-mode fiber-optic transmission system that automatically optimizes the coupling through the system. In a specific embodiment, a measurement of coupled power is made and error signals are used to control actuation via four axes of beam steering elements to null four generally orthogonal alignment errors (combinations of two lateral errors and two angular errors) of the beam between the input and output fibers. The four alignment errors are detected using a synchronous-detection approach. A feedback control system nulls the four errors.

25 Claims, 3 Drawing Sheets

METHOD AND APPARATUS FOR OPTICAL BEAM ALIGNMENT DETECTION AND CONTROL

BACKGROUND OF THE INVENTION

The invention relates to optical switching and free-space coupling of fiber optic waveguides in a single-mode fiber-optic transmission system. The invention finds application to micro-electromechanical systems (MEMS), but it is not so limited.

Four-axis detection schemes in fiber optic switch fabrics are known which use complex metrology systems to indirectly infer positioning of a laser beam of interest. One such technique, which is representative of the prior art, is described in U.S. Pat. No. 6,097,858, assigned to Astarte Fiber Networks of Boulder, Colorado. It uses forward- and reverse-facing metrology lasers (i.e., lasers located at input fibers and output fibers, respectively) and two-axis photoconductive sensors surrounding the input and output fibers to detect the beam alignment as measured by the metrology system. Since these augmented-metrology systems do not make direct use of the power signal they are attempting to maximize, their performance (ability to maximize the coupled power) is degraded by the unavoidable time-varying misalignment between the metrology system and the actual beam.

A Melles Griot active alignment system for fiber-optic coupling known as the NanoTrak Autoalignment system uses the measured output power and a synchronous-detection approach to null the errors in two angles using a coning motion in the two controlled axes of an optical mount. Conical scanning, while appropriate for detecting errors in two axes, is not well suited to a four-axis system addressed by the present invention or to systems with even greater degrees of freedom. The key limitation is that coning the first mirror at one frequency and the second mirror at a second frequency yields a coupled power response that contains oscillatory components at frequencies equal to the sums, differences, and first harmonics of the two frequencies, even when the alignment errors (ignoring coning angles) are zero. Thus, the double-coning approach cannot be used in a system requiring a constant output power.

What is needed is a technique for active alignment that overcomes the above limitations.

SUMMARY OF THE INVENTION

According to the invention, methods and apparatus are provided for detection and control of multiple-axis active alignment for a free-space-coupled single-mode fiber-optic transmission system that automatically optimizes the power coupled through the system. In a specific embodiment, a measurement of coupled power is made and detected error signals are used to control actuation via four axes of beam steering elements to null four generally orthogonal alignment errors (combinations of two lateral errors and two angular errors) of the beam between the input and output fibers. The four alignment errors are detected using a synchronous-detection approach. A feedback control system nulls the four errors. The theoretical basis as presented here for four-axis detection and control is sufficient for the general case. Therefore, the disclosure is to be understood to address the cases for applications of more or fewer axes than four.

The present invention related to alignment has application to synchronous detection. In the case of four-axis synchronous detection, a control system superimposes four distinct modes of oscillatory commands (dithers) as excitation signals on four nominal steering commands. These dithers, which themselves must be orthogonal, are specifically chosen to produce four corresponding time-orthogonal variations in measured coupled power at the dither frequencies that are proportional to the respective alignment errors. Specific examples of orthogonal mode variable signals for detection as disclosed herein are two sets of sine and cosine signals at two different frequencies. The invention will be better understood by reference to the following detailed description in connection with the accompanying embodiments.

DETAILED DESCRIPTION OF THE INVENTION

Free-Space-Coupled Fiber Optic Switch Using MEMS

Figure 1:
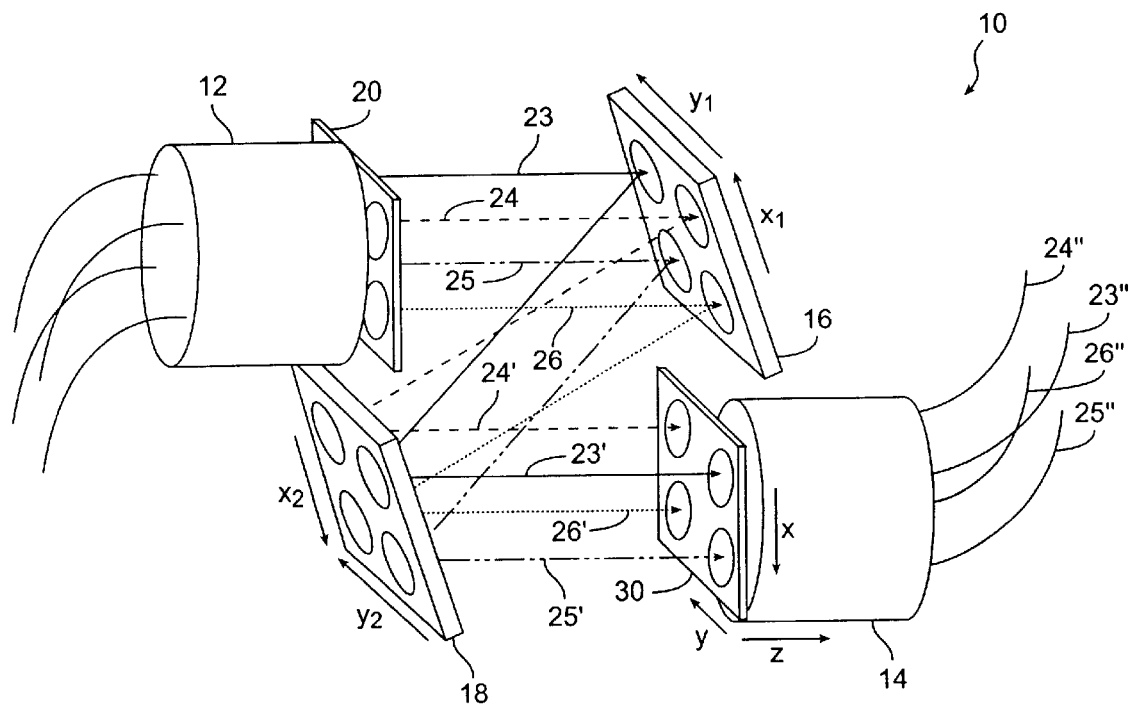
FIG. 1 is a block diagram of a four-port MEMS mirror array fiber optic switch in which the present invention may be implemented.

Referring to FIG. 1 there is shown an example of a four-port MEMS mirror array fiber-optic switch 10 in which the present invention may be implemented. The function of the fiber-optic switch 10 is to produce desired free-space couplings between the input fibers (in a first fiber array 12) and output fibers (in a second fiber array 14) via two-axis steering mirrors on a first mirror array 16 and a second mirror array 18. In the embodiment illustrating the invention, the optical path is unidirectional between input fibers and output fibers, although the invention is not so limited. Expanding laser beams emanating from the input fiber array 12 are substantially collimated using a first lens array 20 confronting the first fiber array 12. Mirrors on the first or input mirror array 16 steer the collimated beams 23–26 from the first lens array 20 toward the appropriate mirrors on the second or output mirror array 18. The mirrors on the output mirror array 18 steer their incident beams 23'–26' into the corresponding lenses on a second or output lens array 30. The output lenses of the second lens array 30 produce converging beams necessary for coupling power into the output fibers 23"–26" of the second fiber array 14.

Output Beam Alignment Geometry

Figure 2:
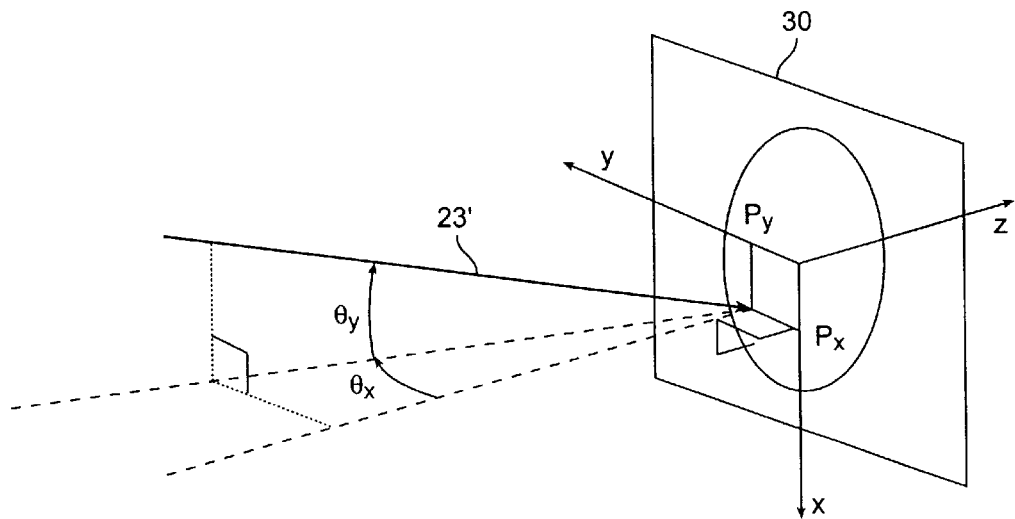
FIG. 2 is a diagram to illustrate beam alignment errors at the output lens as used in the present invention.

Referring to FIG. 2, there is shown a diagram defining the alignment of an output beam relative to its output lens/fiber port in accordance with the invention. This technique may be applied in a variety of geometries, only one of which is that of FIG. 1. The axes "x", "y", and "z" define an "output" frame. The axis z is defined as the optical axis of the particular lens/fiber port (which may vary across the array of lens/fiber ports), and the perpendicular axes x and y are in the plane perpendicular to z. The beam intersects the output x-y plane at the linear displacements $P_x$ and $P_y$ in x and y, respectively. The two angles $\theta_x$ and $\theta_y$ define the orientation of the beam in the output x-y-z frame. With $\theta_x$ and $\theta_y$ equal to zero, the beam is parallel to the z axis. $\theta_x$ and $\theta_y$ are the rotations of the beam in the x and y directions, respectively, where a small-angle approximation (valid for the purpose of analyzing optical coupling) eliminates the need to define the order of the rotations. To clarify the sense of the rotations, the small-angle approximation for the unit vector in the direction of the beam expressed in the output frame is given by:

$$u_{beam}{}^{out}=[\theta_y, -\theta_x, 1].$$

Gaussian Power Coupling

Assuming that longitudinal misalignments are zero and that the beam is matched to the mode field radius of the output fiber, the total coupled power $P_{out}$ (a scalar quantity measured at the output fiber) can be approximated in a Gaussian form in terms of an input power $P_{in}$ and four normalized beam alignment errors:

$$P_{out}=P_{in}e-(\alpha^2+\beta^2+\rho^2+\sigma^2), \quad (1)$$

where $P_{in}$ is the optical power before loss due to alignment errors, and the four normalized errors $\alpha$, $\beta$, $\rho$, and $\sigma$ are given by:

$$\alpha = \frac{f}{\omega_0}\theta_x,$$

$$\beta = \frac{f}{\omega_0}\theta_y,$$

$$\rho = \frac{n_{gap}\pi\omega_0}{\lambda f}(P_x - f\theta_y), \text{ and}$$

$$\sigma = \frac{n_{gap}\pi\omega_0}{\lambda f}(P_y + f\theta_x),$$

where:
  f is the lens focal length,
  $w_0$ is the beam radius at $1/e^2$ power density,
  $\lambda$ is the laser wavelength, and
  $n_{gap}$ is the index of refraction of the medium in the lens/fiber gap.

Constant-Power Dithering

Figure 3:
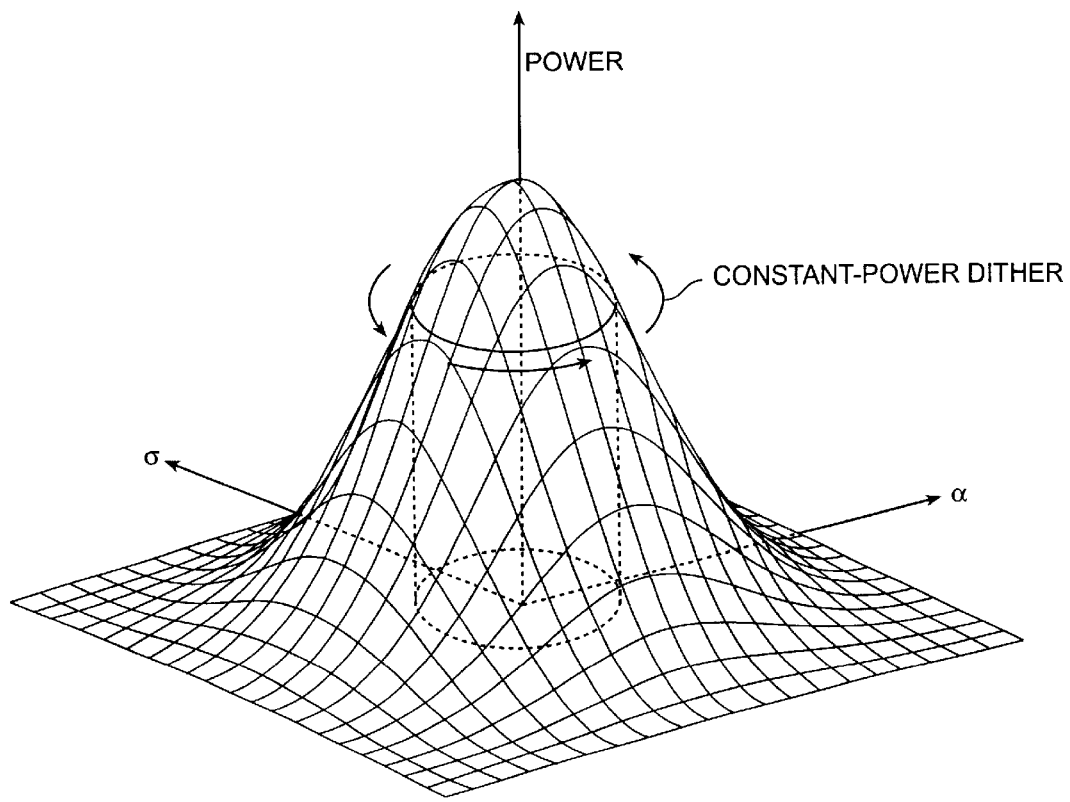
FIG. 3 is a three dimensional graph to illustrate constant-power dithering.

In the case of a MEMS fiber-optic switch for which the coupled power is Gaussian in the four normalized alignment errors, quadrature (sine and cosine signals at a given frequency) dithering of the beam alignments produces a constant coupled power when the alignment errors (ignoring the dither component) are zero and the model parameters of the system are properly tuned. FIG. 3 illustrates for two of the four axes the concept of using quadrature dithering to provide a constant output power when the coupled power is Gaussian in the two alignment errors shown. When the alignment errors (ignoring the dither component) are zero as in FIG. 3, the sine and cosine dithers at any given frequency, whether above or below the natural resonance of the device, produce a circular trajectory in the two alignment errors. Since the sum of the squares of these two alignment errors is constant (due to the sine and cosine dithering), the result, as dictated by Equation 1, is a constant attenuated coupled power even though the individual errors are changing. If the other two dithers are also in quadrature form, these dithers will contribute a second constant loss term, such that the overall attenuation level due to the four dithers is constant.

Synchronous Alignment-Error Detection Technique for Gaussian Coupling

As discussed previously, the four normalized coordinate errors in angles $\alpha$ and $\beta$, and positions P and O are detected using synchronous detection. The detection process is explained as follows for the simplified case of a scalar normalized error x. The coupled output power is given in Gaussian form by $$P_{out}=P_{in}e^{-x^2},$$

where x(t) at time t is the sum of the unknown error $x_u$ and the known sinusoidal dither component $x_d(t)$ at frequency $f_d$:

$$x=x_u+x_d.$$

The logarithm of the power $P_{out}$ is given by:

$$\log(P_{out})=\log(P_{in})-x^2.$$

Since the quantity $x^2$ is given by:

$$x^2 = (x_u + x_d)^2$$
$$= x_u^2 + 2x_ux_d + x_d^2,$$

the log of the power is given by:

$$\log(P_{out})=\log(P_{in})-(x_u^2+2x_ux_d+x_d^2).$$

Defining $\lambda$ as the negative of the log of the power:

$$\lambda=-\log(P_{out}),$$

$\lambda$ is given by:

$$\lambda=(x_u^2-\log(P_{in}))+2x_ux_d+x_d^2.$$

The expression $\lambda$ can be decomposed into three components as follows:
1. $(x_u^2-\log(P_{in}))$ is a near-dc term (assuming a constant $P_{in}$ and that the signal content of $x_u$ is at low frequencies relative to $f_d$);
2. $2 x_u x_d$, a modulation of the unknown error and the dither, has a term at $f_d$;
3. $x_d^2$ has a DC term and a $2f_d$ term.

The squaring effect of the coupling thus produces a component in the logarithm of the power (component #2 of $\lambda$) proportional to the dither signal $x_d$ modulated by the unknown alignment error $x_u$. The unknown error $x_u$ can be extracted from $\lambda(t)$ using a demodulation process by multiplying $\lambda(t)$ by the dither signal $x_d(t)$ and filtering the resulting product to remove the residual terms at the dither frequency and its harmonics. The multiplication step produces the product signal $\Lambda(t)$ given by:

$$\Lambda(t)=\lambda(t)x_d(t).$$

The product of $\lambda(t)$ and the sinusoidal dither $x_d(t)$ yields various powers of $x_d(t)$ in $\Lambda(t)$. The DC terms of $\lambda$ yield a term in $\Lambda$ proportional to $x_d$ with signal content at the dither frequency $f_d$. The $2f_d$ term of the $x_d^2$ component of $\lambda$ produces signals in $\Lambda$ at $f_d$ and $3f_d$. The $2 x_u x_d$ component yields a DC term in $\Lambda$ (the detected error $x_{det}$) proportional to $x_u$ and the amplitude of $x_d$, and also yields a signal in $\Lambda$ at $2f_d$ with an amplitude proportional to the square of the amplitude of $x_d$. The detected error $x_{det}$ is the sole term of $\Lambda$ at DC and can be separated using a moving average filter spanning a time period $T_{avg}$ equal to one or more periods $T_d$ of the dither signal ($T_d=1/f_d$). Such a filter preserves the low-frequency band of its input signal, while squelching signals at the averaging frequency $f_{avg}=1/T_{avg}$ and its harmonics. Filtering Λ with this filter thus extracts the detected error $x_{det}$ while squelching the signal content at $f_d$ and its harmonics:

$$x_{det}=\text{MoveAvgFilt}(\Lambda(t)).$$

Figure 4:
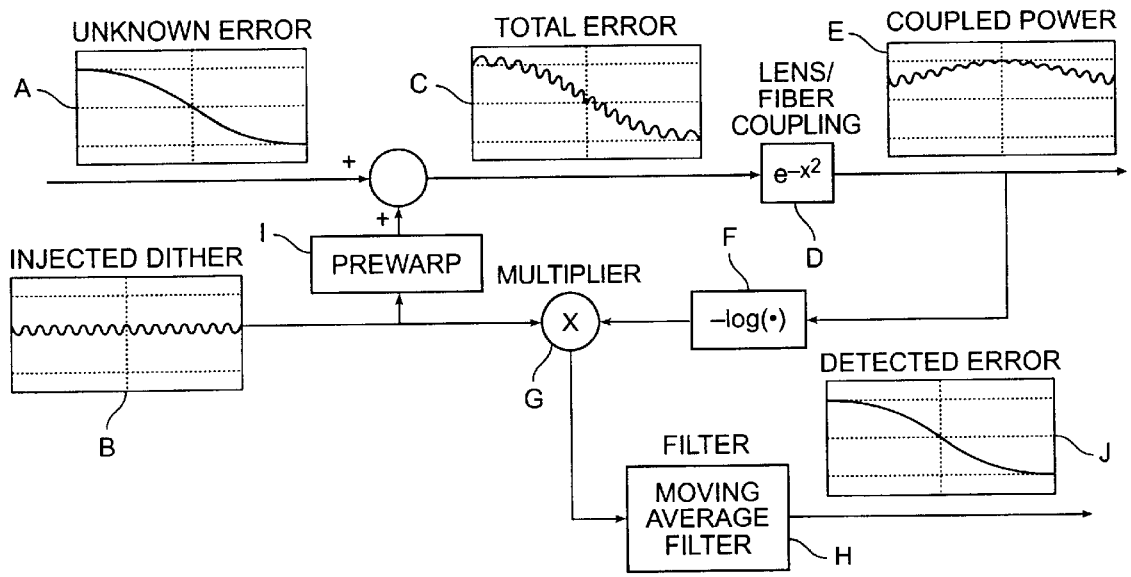
FIG. 4 is an illustrated flow chart to show steps in the synchronous detection method according to the invention.

FIG. 4 illustrates the method of synchronous detection with Gaussian coupled power according to the invention. Referring to FIG. 4, the unknown beam alignment error A and mechanically injected dither B (altered by the prewarp function I) combine to produce a total alignment error x (as shown in C) at the output lens. The fraction of power in beam 23' coupled into fiber 23" (as shown in FIG. 1) is given by the Gaussian function of the alignment errors $e^{-x^2}$ as shown in D, which produces an optical output power $P_{out}=P_{in}\,e^{-x^2}$ having a characteristic E as illustrated. The logarithm function F of the output power extracts the quantity $x^2$. This quantity, which contains a modulation of the unknown error and the dither, is demodulated by multiplication G by the dither B. Filtering the demodulated signal with a moving average filter H with the appropriate frequency response tailored to the dither yields the detected error signal J. The prewarp I modifies the gain and phase of the dithers as a preemptive counterbalance to effects of the plant and control system on measured coupled power gain and phase. Increasing the frequency of the dithering allows for a higher detection bandwidth without departing from the desirable constant power characteristic. If the frequency of the dithers is sufficiently above the resonant frequency of the MEMS device, the detection bandwidth may also be sufficient to allow attenuation of resonant responses.

Extending the Detection Technique to Four Axes

According to the invention, the synchronous detection technique described in the previous section can be extended to simultaneously detect errors in the four alignments associated with the MEMS fiber-optic switch (as shown in FIG. 2). In this case, four time-orthogonal mode dither signals are used in conjunction with the four beam alignment coordinates. The approach is to excite the four beam-alignment coordinates with the four orthogonal dithers in a one-to-one manner to ensure a decoupled detection of the alignment errors.

As an example, the invention may be implemented using sine and cosine signals at two disparate frequencies for the four dithers, with the averaging frequency $f_{avg}$ and two dither frequencies $f_1$ and $f_2$ having the ratio 1:2:3, respectively:

$$f_1=2f_{avg},$$

$$f_2=3f_{avg}.$$

In the time period of one averaging cycle given by $T_{avg}=1/f_{avg}$, the 2× dithers repeat twice and the 3× dithers repeat three times, at which time the four dithers complete one full cycle of relative phasing. The time period $T_{avg}$ for this full cycle of relative phasing is the defining time period for the notion of time-orthogonal bases. In one averaging period, the mean value of the products of the four dither signals is zero. Averaging over the full cycle of relative phasing thus prevents cross-dither-frequency interference in the demodulation phase. The sine and cosine dither signals at each dither frequency are inherently time-orthogonal with each other over a single cycle of their respective periods, so they are naturally time-orthogonal over $T_{avg}$ equal to 2× or 3× of their cycles times.

Control System

Figure 5:
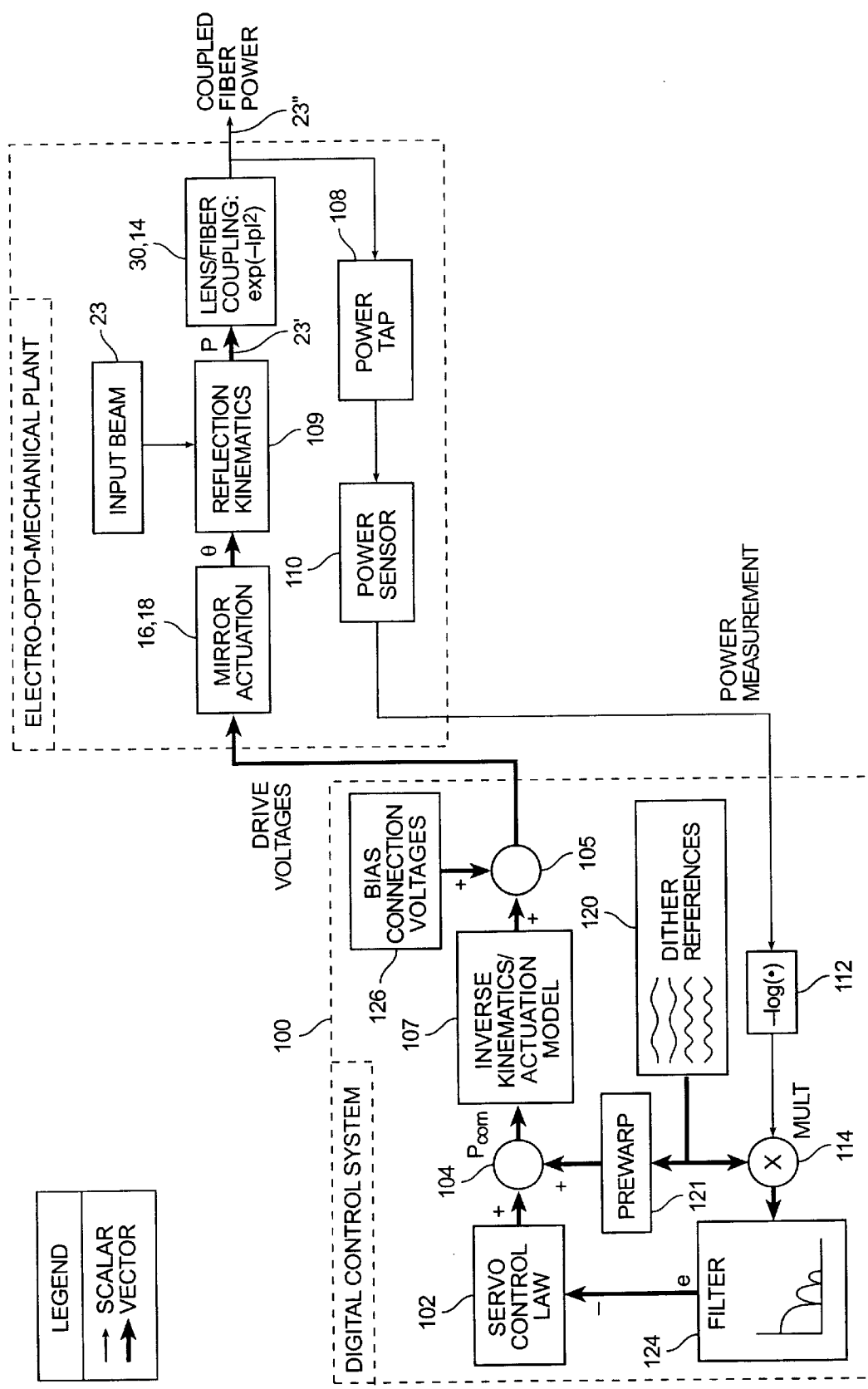
FIG. 5 is a schematic diagram of a control system according to the invention.

FIG. 5 is a schematic diagram of a control system 100 according to the invention illustrated in interaction with elements of a fiber optic switch of FIG. 1. The control system 100 provides detection and servo control of alignment errors. The control system 100 supplies the actuation voltages for a pair of MEMS mirrors on mirror arrays 16 and 18. The MEMS mirrors produce the four mirror angles as a function of the actuation voltages. Reflection kinematics 109 specific to the optical design define the mapping of the four mirror angles to the four beam alignment errors at the output lens of lens array 30 (as shown in FIG. 2). As defined in Equation 1, the coupling of power into the output fiber of output fiber array 14 is Gaussian in the four beam alignment errors. FIG. 5 schematically illustrates the transformation shown in FIG. 1 in which beam 23 is steered by mirrors 16 and 18 to yield beam 23' incident at a lens in the output lens array 30, and the coupling of incident beam 23' through the lens into the associated fiber 23" of the output fiber array 14. A power tap 108 at the optical output supplies the feedback signal, which is converted to an electrical signal by a photodetector 110. Within the control system 100, the feedback power signal is converted to a log signal by log function 112, which in turn supplies the input to a multiplier 114. The dither reference signals 120 are fed to the multiplier 114 and the prewarp stage 121. The prewarp stage modifies the gain and phase of the dithers as a preemptive as counterbalance to the effects of the plant and control system on the gain and phase of the measured coupled power.

Referring again to FIG. 5, the output of the multiplier 114, which is the product of the dither references 120 and the logarithm of the measured power 112, is supplied to a filter 124. The filter 124 may be a moving average filter of a pre-selected cycle length for extracting the error signal (near DC) components while squelching the artifacts of the dithering references, as explained previously. The error signal e is supplied to the servo control law element 102, which produces a set of feedback control signals.

The summer 104 combines the feedback control signals from servo element 102 and the prewarped dithers from prewarp stage 121, both of which are vectors in the output-space components α, β, ρ, and σ. The inverse kinematics and actuation element 107 converts the output-space commands into voltage feedback commands. The nominal connection bias voltages 126 are added to the feedback voltage commands at summer 105 to produce the actuator voltage commands.

Novel Features

Several aspects of this four-axis detection approach are novel. First, the present invention makes direct use of the measured coupled power signal rather than an in-parallel metrology system (with associated tolerance and drift errors) to detect the four controllable errors in the system, thereby guaranteeing an unbiased error estimate for use by the controller and thus maximum output. Second, the invention is the first use of synchronous detection as a means of detecting the four beam alignment errors. Third, the dither modes (static combinations of steering commands) are chosen to minimize coupling in the error detection (such that individual errors do not influence the values detected for the other errors). Decoupled detection enables faster servo response. Fourth, the modulation and demodulation dither signals are amplified and time-phased in a prewarp stage to accommodate gain and phase in the system, which prevents an additional frequency-dependent coupling in the error detection. Fifth, the modulation/demodulation technique specifies how to choose two dither frequencies and a third averaging frequency to prevent cross-frequency interference, another source of coupling in the detection. Sixth, the relative amplitudes of the dithers are scaled to yield a constant output power when the alignment errors are zero.

The invention has numerous advantages. If the beam alignment error is zero, then the response in power coupled through the system is flat, and there will be no power variation it the frequency of the applied dithering signals, even though dithering may lower the DC power level of the output signal. Moreover, no harmonics of the dither frequencies will be evident in the power of the output signal, since the two dithers at a given frequency are in two orthogonal axes in phase quadrature with each other. This is evident from an examination of FIG. 3.

Alternate Implementations

Choices other than sine and cosine waves at two frequencies are possible for the dither mode variables. Sinusoids at four frequencies can be used, but the output power cannot be made constant and the averaging scheme used to minimize cross-frequency interference becomes more difficult. Spread-spectrum dithers are also possible, but suffer from the same issues.

Rather than using spatially decoupled dither modes as previously described, spatially coupled modes can be used. In this case, an extra step of decoupling the demodulated error signals is necessary.

Other choices of averaging and dither frequencies are possible. For example, a 1:1:2 combination of average and dither frequencies provides a time-orthogonal set, but residual harmonics of the 1× dither will corrupt the detection at the 2× frequency. Other multiples are also possible, but each case needs to be evaluated with respect to properties of the system.

The invention has been explained with reference to specific embodiments. Other embodiments will be evident to those of ordinary skill in the art. For example, this beam alignment system may be applied to beam tracking and the like. It is therefore not intended that this invention be limited, except as indicated by the appended claims.

What is claimed is:

1. In an optical beam alignment system with output of a measurement of coupled power of a beam without access to direct measurement of beam alignment, the alignment system having a beam directing controller, a method for detecting alignment errors in an alignment element for the beam comprising:
   applying a plurality of orthogonal excitation signals to the alignment element in order to move the alignment element to cause the beam directed through the alignment element to produce orthogonal variations in measured coupled power of the beam;
   detecting said variations in the measured coupled power; and
   correlating the measured coupled power with the orthogonal excitation signals to produce orthogonal error signals, each orthogonal error signal corresponding to an alignment parameter for the beam directing controller.

2. The method according to claim 1 wherein said excitation signals are sine and cosine signals at two different frequencies.

3. The method according to claim 1 wherein the step of applying orthogonal excitation signals further includes pre-warping said excitation signals to modify excitation signal gain and phase to preemptively counterbalance effects of control system and plant on measured coupled power gain and phase.

4. The method of claim 1 wherein the step of applying orthogonal excitation signals includes applying signals at frequencies above natural resonance.

5. The method according to claim 4 wherein the excitation signals are of frequencies high enough to yield a detection bandwidth sufficient to allow attenuation of resonant responses.

6. The method according to claim 1 wherein said alignment parameter is relative to a fixed lens element, further including:
   mapping each said alignment parameter to a set of control parameters controlling at least one of position, angle, path length and polarization of an alignable component.

7. The method according to claim 1 wherein four unknown alignment errors are detected.

8. The method according to claim 1 wherein alignment errors in a plurality of axes are detected by:
   simultaneously demodulating the logarithm of the measured coupled power with said plurality of orthogonal excitation signals to obtain a corresponding plurality of demodulated power signals; and then
   averaging the demodulated power signals over a minimum time period to remove ripple components, the minimum time period being the shortest period of time in which relative phasing of said excitation signals repeats.

9. The method according to claim 6 wherein for four degrees of freedom in a coupling space the orthogonal excitation signals comprise four corresponding time-dependent orthogonal dither signals.

10. The method according to claim 1 wherein the orthogonal excitation signals impose controlled dithering so that instantaneous measured response in the measured coupled power is flat in spite of said controlled dithering.

11. The method according to claim 2 wherein the two different frequencies have a 2:3 ratio.

12. In an optical beam alignment system with output of a measurement of coupled power of a beam without access to direct measurement of beam alignment, the alignment system having a beam directing controller, a method for correcting alignment errors in an alignment element for the beam comprising:
   applying a plurality of orthogonal excitation signals to the alignment element to move the alignment element in order to cause the beam directed through the alignment element to produce orthogonal variations in measured coupled power of the beam;
   detecting said variations in the measured coupled power;
   correlating the measured coupled power with the orthogonal excitation signals to produce orthogonal error signals, each orthogonal error signal corresponding to an alignment parameter for the beam directing controller;
   applying said orthogonal error signals to servo control means; and
   applying output of said servo control means to said alignment element to correct alignment of said alignment element.

13. The method according to claim 12 wherein said excitation signals are sine and cosine signals at two different frequencies.

14. The method according to claim 12 wherein the step of applying orthogonal excitation signals further includes pre-warping said excitation signals to modify excitation signal gain and phase to preemptively counterbalance effects of control system and plant on measured coupled power gain and phase.

15. The method of claim 12 wherein the step of applying orthogonal excitation signals includes applying signals at frequencies above natural resonance.

16. The method according to claim 15 wherein the excitation signals are of frequencies high enough to yield a detection bandwidth sufficient to allow attenuation of resonant responses.

17. The method according to claim 12 wherein said alignment parameter is relative to a fixed lens element, further including:
   mapping each said alignment parameter to a set of control parameters controlling at least one of position, angle, path length and polarization of an alignable component.

18. The method according to claim 12 wherein four unknown alignment errors are detected.

19. The method according to claim 12 wherein alignment errors in a plurality of axes are detected by:
   simultaneously demodulating the logarithm of the measured coupled power with said plurality of orthogonal excitation signals to obtain a corresponding plurality of demodulated power signals; and then
   averaging the demodulated power signals over a minimum time period to remove ripple components, the minimum time period being the shortest period of time in which relative phasing of said excitation signals repeats.

20. The method according to claim 17 wherein for four degrees of freedom in a coupling space the orthogonal excitation signals comprise four corresponding time-dependent orthogonal dither signals.

21. The method according to claim 12 wherein the orthogonal excitation signals impose controlled dithering so that instantaneous measured response in the measured coupled power is flat in spite of said controlled dithering.

22. The method according to claim 12 wherein said orthogonal excitation signals are time dependent orthogonal periodic dither signals, and wherein dithering is along isopower contours in a five dimensional coupling space, where one of the isopower contours corresponds to a trajectory through a plurality of coordinates of the dither signals such that resultant measured power is constant.

23. In an optical beam alignment system with output of a measurement of coupled power of a beam without access to direct measurement of beam alignment, an alignment error detector for the beam comprising:
   means for applying a plurality of orthogonal excitation signals to an alignment element to move the alignment element in order to cause the beam directed through the alignment element to produce orthogonal variations in measured coupled power of the beam;
   an optical power detector for detecting said variations in the measured coupled power; and
   means for correlating the measured coupled power with the orthogonal excitation signals to produce orthogonal error signals, each orthogonal error signal corresponding to an alignment parameter for the beam directing controller.

24. In an optical beam alignment system with output of a measurement of coupled power of a beam without access to direct measurement of beam alignment, an alignment error controller for the beam comprising:
   means for applying a plurality of orthogonal excitation signals to an alignment element to move the alignment element in order to cause the beam directed through the alignment element to produce orthogonal variations in measured coupled power of the beam;
   an optical power detector for detecting said variations in the measured coupled power;
   means for correlating the measured coupled power with the orthogonal excitation signals to produce orthogonal error signals, each orthogonal error signal corresponding to an alignment parameter for the beam directing controller;
   means for applying said orthogonal error signals to servo control means; and
   means for applying output of said servo control means to said alignment element to correct alignment of said alignment element.

25. The apparatus according to claim 24 wherein the orthogonal excitation signals are sine and cosine at frequencies which have a 2:3 ratio.

* * * * *